United States Patent [19]

Schönhuber

[11] 4,455,483

[45] Jun. 19, 1984

[54] SYSTEM FOR RECORDING DATA RELATING TO SPECIFIC LOTS OF MATERIALS, PARTICULARLY TO MILK LOTS

[76] Inventor: Max-J. Schönhuber, Seefeldquai 1, CH 8008 Zürich, Switzerland

[21] Appl. No.: 313,778

[22] Filed: Oct. 22, 1981

[30] Foreign Application Priority Data

Oct. 24, 1980 [DE] Fed. Rep. of Germany ....... 3040171

[51] Int. Cl.³ .............................................. G01F 1/00
[52] U.S. Cl. .................................... 235/375; 361/103; 361/101; 235/385
[58] Field of Search ............... 235/375, 385, 384, 383, 235/462, 493; 364/401, 402, 403, 415, 416

[56] References Cited

U.S. PATENT DOCUMENTS

| | | | |
|---|---|---|---|
| 3,679,875 | 7/1982 | Rawson et al. | 235/375 |
| 3,831,006 | 8/1974 | Chaffin et al. | 235/375 |
| 3,848,112 | 11/1974 | Weichselbaum et al. | 235/375 |
| 3,921,196 | 11/1975 | Patterson | 235/375 |
| 3,961,527 | 6/1976 | Sonnberg et al. | 73/861.77 |
| 4,164,320 | 8/1979 | Irazoqui et al. | 235/375 |
| 4,283,709 | 8/1981 | Lucero et al. | 340/147 R |
| 4,340,810 | 7/1982 | Glass | 235/375 |

*Primary Examiner*—A. D. Pellinen
*Assistant Examiner*—Robert Lev
*Attorney, Agent, or Firm*—David S. Fishman

[57] ABSTRACT

A system is presented for recording data relating to specific lots of materials, particularly milk lots, wherein the data are collected at delivery locations by a collecting vehicle and are brought by the vehicle to a collecting station, the system comprising a recorder in the vehicle, which recorder includes data input means, a controlled unit means and memory means, and the system further comprising a collecting station where data from the vehicle is converted and stored on two different data carriers, and the system further comprising stationary data processing units which receive the data from the two different data carrying units in the collecting stations.

11 Claims, 3 Drawing Figures

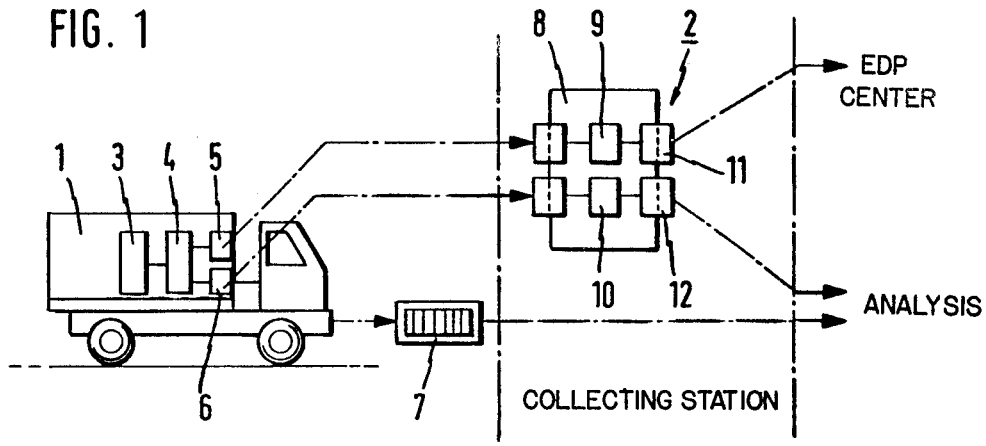
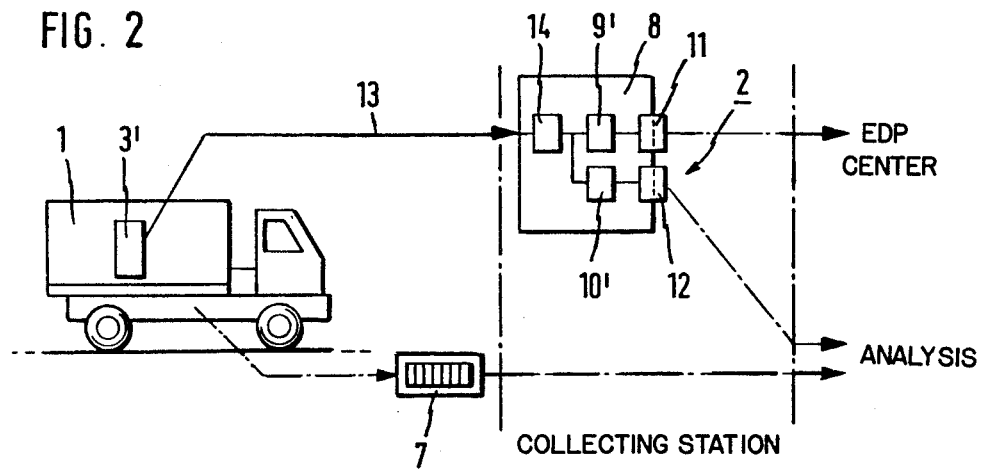
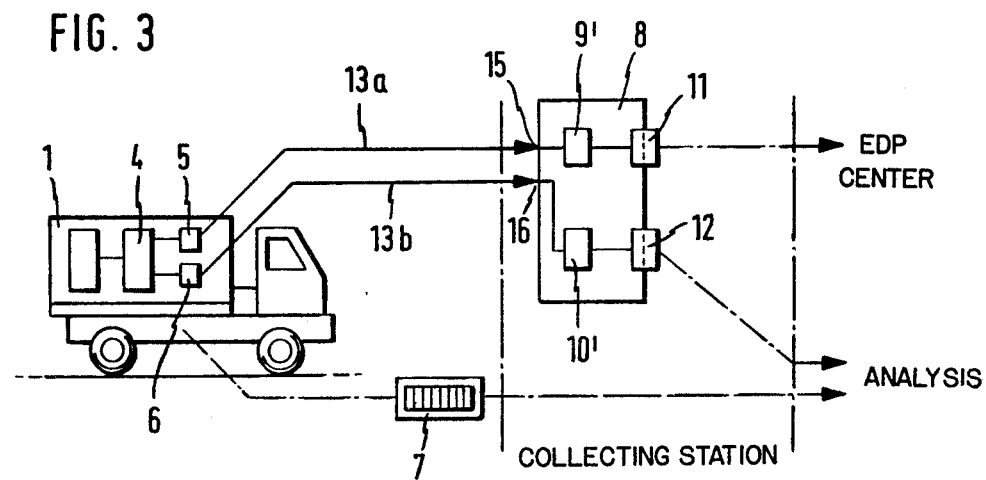

SYSTEM FOR RECORDING DATA RELATING TO SPECIFIC LOTS OF MATERIALS, PARTICULARLY TO MILK LOTS

This invention relates to a system for recording data relating to specific lots of materials, particularly to milk lots, which are collected at delivery locations by a collecting vehicle and are brought by the latter to a collecting station, which system comprises a recorder, which is provided in the collecting vehicle and includes data input means, a control unit connected thereto, and a memory, which is coupled to the control unit, further comprises at least two stationary data-reading and/or data-writing and/or data-processing devices and means for transmitting the contents of the memory to said at least two data-reading and/or data-writing and/or data-processing devices.

It is believed that the understanding of the invention will be facilitated if the known techniques relating to the preferred field of application of the invention, namely, the collection of data relating to milk lots, are discussed first.

Electronic data-collecting devices which can be mounted on or in milk-collecting vehicles serve to collect data which become available as the milk is collected. Such data are recorded on a data carrier in a memory and, as a rule, are printed to form a readable document. The system carried by the vehicle comprises data input means, control means and memory means.

Before the collecting vehicle begins a trip, so-called basic data are recorded and stored by the operation of simple code switches or by means of an input keyboard and/or code cards. The basic data include, inter alia, the dairy's number, the number of the collecting station associated with the dairy, the number of the milk-analyzing laboratory, the number of the collecting vehicle, the driver's number, the number of the route of the vehicle and particularly the data and, if desired, the time when the trip begins.

When milk is collected at a delivery location, the data which then become available are recorded. These data include the supplier's number which is read by an identification card reader or by a can code reader for identifying the cans, also data relating to the quality of the milk, such as the temperature of the milk at the time of acceptance, and other physical and chemical measured values, which are delivered by suitable transducers, also data which indicate the quantity of milk supplied by each supplier and are delivered by a pulse generator, and, if desired, data which indicate the sequence in which samples are taken and which are indicated by a counter.

The memory means of the recorder of the collecting vehicle comprise a data memory and, if desired, a data buffer memory. The data memory may comprise a removable data carrier, which often consists of a magnetic cassette or metal tape cassette. In the data processing apparatus of the diary or in a regional data processing center, the data stored on the data carrier are evaluated and processed for the calculation of the money which is to be paid for the milk.

In the course of the further development of memory technologies, the removable memory cassette has sometimes been replaced by semiconductor memories or solid-state memories, which are available at progressively decreasing costs and which, by relatively simple electronic interfacing devices, can easily be coupled to the existing electronic functional units comprising integrated circuits. Such semiconductor and solid-state memories have the advantage that they are not subject to wear and need not be serviced.

Owing to the advent of solid-state memories, the magnetic tape or metal tape cassette memories, having movable parts which are subjected to wear and must be serviced, can be removed from the milk-collecting vehicles associated with a milk-collecting station and can be used in a single stationary converter, which is located at the milk-collecting station and available for all collecting vehicles. The data stored e.g., in semiconductor memories on the milk-collecting vehicles are transferred, in said converter, to machine compatible memories, the contents of which can be utilized directly in the data-processing center. Such machine compatible memories consist, e.g., of magnetic tape memories having such a tape width that they can be used in the computer floppy disks etc.

Whereas that practice requires a converter which must be installed at the milk-collecting station, its cost will be more tha offset, (a) by the savings which are due to the price difference between the memories of the new memory technologies, such as semiconductor memories or solid-state memories, which are used in the recorders of the milk-collecting vehicles, and the tape memories conventionally employed on such vehicles, which price difference must be multiplied with the number of milk-collecting vehicles associated with a milk-collecting station, and (b) by the savings which are due to the elimination of the previously required converting equipment at the data-processing center.

Two methods are mainly employed for transmitting collected data from the recorder of the milk-collecting vehicle to the milk-collecting station. Either the removable data carrier of the memory of the recorder of the milk-collecting vehicle is removed from such recorder and is inserted at the milk-collecting station into a converter installed at such station and serving to process and convert such data, or the data are directly read into the converter at the milk-collecting station by a line which connects the milk-collecting vehicle to the milk-collecting station. As a result, a machine compatible data carrier is prepared at the milk-collecting station as the milk is withdrawn from the milk-collecting vehicle. These practices open up various possibilities for a partial automation of the electronic collection of data during the acceptance of milk by milk-collecting vehicles.

But the practices described hereinbefore do not permit a complete automation of the collection and processing of data as milk is collected by collecting vehicles. In that connection it must be borne in mind that it is not sufficient to transmit to the data-processing center the data which have become available at the delivery location and relate to respective suppliers, but at least some of such data must be made available to the milk sample-analyzing laboratory and must be coordinated with and allocated to additional data that become available in the analyzing laboratory and must then also be delivered to the data-processing center.

In the desire to permit complete automation, a technology has been adopted in which the sample bottles containing individual samples are provided with respective recordings. For this purpose a data carrier on the bottle is provided with the required basic or head data, also with data corresponding to the date when the sample has been taken, the supplier's number or other data indicating the origin of the sample, and the quantity of milk that has been delivered. Whereas this practice does not require that a predetermined sequence and arrangement of the sample bottles be observed and maintained, it is necessary, e.g., to make a recording on a magnetic tape which is provided on the absolutely circular periphery of the sample bottle. An additional disadvantage resides in that the sample bottles must be moved by a relatively expensive mechanism, a recording mechanism is required which is also expensive, and the complete head data or basic data must be recorded on each sample bottle or its data carrier. A further disadvantage resides in that standard modules which are conventional in computers or computer technology, cannot be used in said technology, but it is relatively expensive special designs, also of the means for cooling the bottles, which must be used.

Besides, if all milk-collecting vehicles are to be arranged for use within such system, an expensive conversion will be required, and in case of a technical defect of the recorder, it will not be possible to input the sample data by hand because the bottles are not longer arranged in a predetermined sequence in stands so that it would be necessary to provide a hand written list indicating the sequence of suppliers or to write by hand on each sample bottle the basic or head data and the supplier's number. Such requirements could hardly be met in practice, particularly with a view to the subsequent handling and processing in the analyzing laboratory.

An additional difficulty with known systems, particularly of the kind just considered, resides in that, in case of the regional introduction, it is necessary to use the same kind of system in the neighbouring regions in order to preserve the possibility of freely selecting new optimized routes of the collecting vehicles and allocated milk-collecting stations, so that a totally new system, though possibly more practical and cost saving, could not replace the existent system, and this not even regionally.

For this reason it has been attempted to initiate the difficulties mentioned above in that the sample bottles were held in fixed relative positions in a circular array and were associated with a common data carrier, which extended around the periphery of the sample bottle holder. It was then possible to jointly record on such data carrier the basic data or head data for a group of sample bottles so that it was no longer necessary to repeatedly record said basic or head data on individual data carriers associated with respective sample bottles. But that practice involved also an expensive redisign of the milk-collecting vehicles in use and special designs of the data writing and data-reading equipment.

Both systems, using inscriptions on the individual bottles and a recording on a magnetic tape extending around the periphery of a circular array of bottles respectively, so as to permit a complete automation of the electronic collection of data at the milk-collecting vehicle, still require bulky sample-taking equipment, which in one case, owing to the requirements of the system, is as large as twice the volume required for one set of bottles as the same volume is required for accommodating the empty bottles so that they are ready to receive the samples and for accommodating the filled sample bottles. In addition, a passage for the transfer of the bottles is required between the two volumes and must accommodate the sample-feeding device and the means for providing an inscription on each sample bottle. In both systems the recording of information on the magnetic tape must be effected at the location where the samples are taken rather than in the preferred place in the driver's cab. Applicants earlier U.S. patent application Ser. No. 127 117 of Mar. 4, 1980 discloses the provision of two data carriers, on which data are recorded under the control of selector means at or within the recorder. The data carriers can be removed from the recorder. One of the data carriers receives the data which are required by the analyzing laboratory and relate to the samples or the lots of milk. This data carrier is delivered together with the sample bottles to the analyzing laboratory, where the data are processed and/or supplemented with the data which are ascertained and delivered by the analyzing laboratory. The other data carrier is delivered directly to a data-processing center. The operation of that system is relatively simple under normal conditions as well as in case of a technical defect.

That known system avoids the disadvantage residing in an expenditure of time for recording the basic data on data carriers associated with respective sample bottles, as well as the disadvantage residing in the need of special designs of the means for providing inscriptions on the sample bottles and of the means for moving the sample bottles and particularly for cooling the sample bottles. It also avoids the disadvantage residing in a recording of data outside the preferred environment of the driver's cab, as well as the disadvantage residing in an expensive and difficult conversion of the sample-taking devices of all milk-collecting vehicles which are already in use. Besides, that system does not require a bulky sampling device and mechanism because the sample bottles are arranged one beside the other with a close spacing and in a predetermined, non-confusible sequence in standardized stands, which can be automatically delivered to the analyzing equipment in the analyzing laboratory and occupy the same space within a samples box whether they are empty or filled. This results in an important saving of labor if samples are filled into the bottles in a sterile or almost sterile manner by means of an injection needle, as is more and more prescribed and used for samples required for an evaluation of the quality and for an bacteriological examination of the milk which has been supplied. In connection with the use of an injection needle for a delivery of samples, the system disclosed in German Offenlegungsschrift No. 29 13 996 affords the advantage that an individual closure which can be pierced by the needle and is otherwise tight need no longer be applied to and removed from each bottle but such closures for all sample bottles may be constituted by a common elastic seal which can be applied to or removed from all sample bottles at the same time by a few manual operations and can be closed or provided with a lead seal so as to prevent unauthorized manipulations. Besides, very inexpensive sample bottles which have large dimensonal tolerances and may deviate from an exact circular shape can be used, a magnetic tape need not be applied to the bottles, and the bottles may be used only once so that a labor-intensive cleaning of the bottles is not required.

But an increased expenditure for equipment will be required because the recorder of each collecting vehicle must incorporate storage media which are compatible with the data-reading and/or data writing and/or data-processing devices at the analyzing laboratory and at the data-processing center.

For this reason it is an object of the present invention so to improve a data-recording system of the kind described briefly at the beginning of this specification that data carriers or data-transmitting channels are made available which are compatible with different stationary data-reading and/or data-writing and/or data-processing devices, e.g., at the analyzing laboratory and at the data-processing center whereas te expenditure for equipment in the collecting station should be minimized.

In accordance with the invention that object is accomplished in that the means for transmitting the data stored in the memory means of the recorder of the collecting vehicle comprise a converter which, at its input, is adapted to receive the data stored in the memory means and which, at its output, presents said data on separate data carriers, which are physically removable from the converter and adapted to deliver said data to respectively associated data-reading and/or data-writing and/or data-processing devices for supplementing and/or processing said data, or which present one part of said data on a data carrier which is physically removable from the converter and adapted to deliver said one part of said data to one of the stationary data-reading and/or data-writing and/or data-processing devices, which serves to supplement and/or process said one part of said data, and to deliver another part of said data via a radio link or a line or telephone line directly to the other stationary data-reading and/or data-writing and/or data-processing devices.

In accordance with this proposal, data carriers which are compatible with the data-reading and/or data-writing and/or data-processing devices at different locations and, preferably are different in kind, need not be provided on all collecting vehicles of the system but for all collecting vehicles of a group, are effectively at disposition in a converter at a collecting station with which the collecting vehicles of said group are associated. As a result, the required storage conversion and/or a recording of data, particularly in a memory having moving data carriers, is effected in a protected region, which is not subjected to the rough or aggressive conditions encountered on a vehicle. Besides, as has been pointed out hereinbefore, the expenditure for equipment is reduced.

The input side of the converter at the collecting station or the input side of the converter and the input side of one of the stationary data-reading and/or data-writing and/or data-processing devices may be connected by a wireless radio link or by a simple connecting line, e.g., a telephone line or a cable, to the recorder of a collecting vehicle. That coupling of the converter to the recorder of the collecting vehicle may be preferred because it involves only a low expenditure for equipment.

Alternatively, the data carriers of the memory means of the recorder of the collecting vehicle may be removable from such recorder and adapted to be inserted into the converter at the collecting station. For instance, the recorder of the collecting vehicle may be designed for this purpose in accordance with the teachings of the above mentioned earlier application. In such case the memory of the recorder of the collecting vehicle may contain a single data carrier, on which data and associated scout addresses are stored in such a manner that a distribution to at least two separate, removable data carriers can be effected in the converter under the control of a selector, or the data may be stored on the collecting vehicle on removable separate data carriers which are adapted to be inserted into the converter, where the data are stored on data carriers in the form required for the further processing of data, e.g., in the analyzing laboratory or in the data-processing and accounting center, and the data carriers which are used in the collecting vehicle are provided with code marks or the like which ensure that each of said data carriers can be inserted into the converter only in an appropriate position.

Illustrative embodiments will now be explained with reference to the drawing, in which FIG. 1 is a diagrammatic elevation view showing a data-recording system with symbols indicating the routes of the data carriers, FIG. 2 is a view that is similar to FIG. 1 and represents a modification of FIG. 1 and FIG. 3 shows a further modification using the same basic principle as the system of FIG. 2.

The milk-collecting vehicle 1 of the data-recording system shown in FIG. 1 is one of several milk-collecting vehicles which are associated with a collecting station 2. The milk-collecting vehicle receives lots of milk at a plurality of delivery locations. As a lot is received, data indicating the quantity of said lot are delivered by a data input device to a recorder 3 and are stored therein and a sample is taken from the lot at the same time. The data representing the measured quantity of the lot and certain other data which become available as the lot is received are distributed under the control of a controller 4 to two separate memories 5 and 6, which contain suitable data carriers. To ensure a proper allocation data becoming available before and during the receipt of a lot, particularly the code number of the supplier of the milk, to a given one of the samples in sample bottles arranged in fixed spatial relationship in a sample bottle holder 7, a sequence number of the sample taken or of the sample bottle or an address of the sample bottle is stored in the memory 6 in association with data relating to said sample, such as the number of the supplier and, if desired, data representing various measured values.

The data stored in the memories 5 and 6 include also basic data, such as the date, the number of the milk-collecting vehicle, the driver's number, the number of a collecting trip and the like. It is sufficient to store said basic data once at the beginning of a collecting trip in association with a group of samples equal in number to the number of sample bottles in the holder or sample box 7. Details can be taken from the U.S.-Patent application mentioned before.

When it is desired to provide identical memories 5 and 6 in order to simplify the manufacture, assembling, maintenance and stocking, a difficulty will arise because the data carries which are physically removable from the memories are generally incompatible with the data-reading and/or data-writing and/or data-processing devices which are installed in the analyzing laboratory used to examine the samples taken, on the one hand, and in the data-processing center, on the other hand, because the data carriers forwarded along different paths are handled in different ways and the data stored on said data carriers are processed in different ways at said laboratory and data-processing center, respectively.

For this reason, a converter 8 is provided at the collecting station 2 and is so designed on its input side that the data carriers removed from the memories 5 and 6 of the milk-collecting vehicle 1 can be inserted into the converter 8 only in respective positions, as is indicated by phantom lines in FIG. 1.

Contact arrangements provided in the converter establish a contact to the inserted data carriers so that each data carrier is succeeded in the converter 8 by an associated converting unit 9 or 10. Data carriers 11 and 12 which can be removed from the converter are associated in the latter with the respective converting units 9 and 10, respectively. While the data carriers of the memories 5 and 6 are preferably indentical, the data carriers 11 and 12 may be entirely different. For instance, the data carriers of the memories 5 and 6 may consist of semiconductor memories or conventional magnetic tape cassettes or metal tape cassettes whereas the data carrier 11 may consist of a magnetic tape having such a width that it can be used in the data-processing center, whereas the data carrier 12 may consist of a magnetic floppy disk.

The data carrier 12 accompanies the sample bottle holder or sample holder 7 like an analysis book into the analyzing laboratory, in which the recorded data may be supplemented by the results of the analysis, and the data carrier 12 is then fowarded to the data-processing center.

The mode of operation of the data-recording system shown in FIG. 2 is basically similar to that of the system shown in FIG. 1. However, in addition to the means for taking samples, a recorder 3' is provided on the milk-collecting vehicle 1 of the system shown in FIG. 2, comprising a date input device, a control unit and memory means including data carriers which cannot be removed from the recorder. The memory means consist preferably of semiconductor memories or solid-state memories. Such memories having substantial storage capacities are commercially available at relatively low cost. As data delivered by measuring transducers, data input stations, data input keyboards and the like are stored in the memory means, the control unit causes scout addresses to be stored in the memory means in association with certain of said data so that when the memory is read the data can be arranged in groups and different groups can be delivered to different memories or different data carriers. In the embodiment shown in FIG. 2 this is not effected on each milk-collecting vehicle but in a single converter 8 at the collecting station. When the milk-collecting vehicle 1 has arrived at the collecting station 2, a cable is laid which connects the collecting vehicle to the collecting station, indicated diagrammatically in FIG. 2 at 13. Instead of a cable, a wireless radio link or a telephone line may be used to connect the memory means of the recorder of the milk-collecting vehicle to the converter 8. The contents of the memory of the collecting vehicle are then read out and transmitted by the link 13 via a selector 14, which is responsive to the above-mentioned scout addresses, and via converting units 9' and 10', which correspond to the converting units 9 and 10 of the embodiment shown in FIG. 1, to the memories comprising data carriers 11 and 12 which can be physically removed from the converter.

In the embodiment shown in FIG. 3, the equipment on the milk-collecting vehicle is similar to that of the embodiment of FIG. 1 with the difference that the data carriers of the memory means of the recorder of the milk-collecting vehicle cannot be physically removed from the recorder but like the memory means of the embodiment shown in FIG. 2, consist of solid-state memories or semiconductor memories which are firmly installed in the recorder. By the control unit, which includes a selector, the data which become available, are distributed to the memories 5 and 6 so that the basic data and data which becomes available as a lot is received, e.g., the supplier's code number and various data representing measured values which are directly required in the data-processing center or the accounting center, are stored in the memory 5 whereas the basic data, the code number of the supplier and data representing measured values required along with the samples in the analyzing laboratory and being supplemented there by the analysis data, are stored in the memory 6.

When the milk-collecting vehicle has arrived in the collecting station, two lines 13a and 13b are provided, with connect the memories 5 and 6 to respective terminals 15 and 16 of the converter 8. The couplings or connectors are so shaped that the terminals cannot be confused. The contents of the respective memories are then transmitted via converting units 9' and 10' to the memories 11 and 12, which contain data carriers that are physically removable and compatible with the data-processing equipment in the stations where the data are required.

What is claimed is:

1. A system for recording data relating to specific lots of materials, particularly milk lots, which are collected at a plurality of locations by a collecting vehicle and are brought by the collecting vehicle to a collecting station, the system comprising:

recorder means in the collecting vehicle, said recorder means including data input means, control unit means, and at least first and second memory means, said control unit means controlling the input of data to said first and second memory means;

at least first and second data carrying means at said collection station, said first and second data carrying means being different from each other and being respectively associated with said first and second memory means, and at least one of said first and second data carrying means being removable from said collecting station;

converter means at said collecting station for receiving the data stored in said first and second memory means and delivering the data for storage on said first and second data carrying means, respectively;

first and second stationary data processing means for receiving the data from said first and second data carrying means, respectively; and means for separately delivering to one of said data processing means identifying data corresponding to the data stored in the respective one of said recorder means in the collecting vehicle.

2. A system for recording data as in claim 1 wherein:
said first and second memory means in said collecting vehicle are connected by a wireless link or by a connecting line to said converting means in said collecting station.

3. A system for recording data as in claim 1 or 2, wherein:
at least one of said first and second data carrying means in said collecting station is connected by a wireless link or by a connecting line to one of said stationary data processing means.

4. A system for recording data according to claim 1, wherein:
the input side of said converter means at the collecting station are connected by a wireless radio link or by a simple connecting line such as a telephone line or a cable to the recorder means in the collecting vehicle.

5. A system for recording data according to claim 1, wherein:
said first and second memory means of said recorder means of the collecting vehicle are adapted to be removed from said recorder means and be inserted into said converter means.

6. A system for recording data according to any of claims 1, 4 or 5, wherein:
selector-distributor means serves to divide the contents of said recorder means into data groups, which are adapted to be transmitted to respective first and second data carriers of said collecting station.

7. A system for recording data according to claim 6, wherein:
said selector-distributor means is contained in said recorder means of the collecting vehicle.

8. A system for recording data according to claim 7, wherein:
said selector-distributor means is adapted to distribute the data to said first and second memory means of said recorder means of the collecting vehicle.

9. A system for recording data according to claim 7, wherein:
said selector-distributor means is adapted to distribute the data to separate output terminals, which are adapted to be coupled to said converter means.

10. A system for recording data according to claim 6, wherein:
said selector-distributor means is in said converter means and is controlled by scout address commands included in the data to be transmitted.

11. A system for recording data according to any of claims 1, 4 or 5, wherein:
said memory means of said recorder of the collecting vehicle comprises solid-state memories or semiconductor memories or magnetic-bubble memories or magnetic tape cassettes or metal tape cassettes.

* * * * *